United States Patent
Chase

(10) Patent No.: US 6,190,030 B1
(45) Date of Patent: Feb. 20, 2001

(54) FLEXIBLE LAMP MOUNTING

(75) Inventor: Lee A. Chase, Grand Rapids, MI (US)

(73) Assignee: Lacks Industries, Inc., Grand Rapids, MI (US)

( * ) Notice: Under 35 U.S.C. 154(b), the term of this patent shall be extended for 0 days.

(21) Appl. No.: 09/252,437

(22) Filed: Feb. 18, 1999

(51) Int. Cl.⁷ ...................................................... F21V 7/04
(52) U.S. Cl. .......................... 362/549; 362/507; 362/369
(58) Field of Search ..................... 362/549, 306, 362/369, 390, 505, 546, 450; 293/117, 120, 132, 138

(56) References Cited

U.S. PATENT DOCUMENTS

| | | |
|---|---|---|
| D. 243,273 | 2/1977 | Braucht ................ 362/549 |
| D. 343,605 | 1/1994 | Meryman . |
| 1,572,024 | 2/1926 | MacInnes ............... 362/505 |
| 1,577,937 | 3/1926 | Slusser ................. 362/505 |
| 1,993,675 | 3/1935 | Long ................... 362/505 |
| 2,613,099 | 10/1952 | Arbib .................. 362/505 |
| 3,088,022 | 4/1963 | Schmidt ................ 362/505 |
| 3,196,265 | 7/1965 | Schneider .............. 362/505 |
| 3,457,397 | 7/1969 | Tindall ................ 362/505 |
| 3,998,178 | 12/1976 | Dutot et al. ........... 116/28 R |
| 4,058,720 | 11/1977 | Renfrow ................ 362/549 |
| 4,310,872 | 1/1982 | Lauve .................. 362/505 |
| 4,380,099 | 4/1983 | Dick et al. ............ 402/329 |
| 4,420,797 | 12/1983 | Tohata ................. 362/496 |
| 4,445,165 | 4/1984 | Sherwood et al. ....... 362/505 |
| 4,466,646 * | 8/1984 | Delmastro .............. 293/117 |
| 4,532,578 | 7/1985 | Gaden et al. ........... 362/549 |
| 4,539,626 | 9/1985 | Hawlitzki et al. ....... 362/549 |
| 4,569,007 | 2/1986 | Dick ................... 362/294 |

(List continued on next page.)

FOREIGN PATENT DOCUMENTS

| | | |
|---|---|---|
| 30427 | 2/1885 | (EP) . |
| 2407451 A1 | 3/1975 | (EP) . |
| 3525198 A1 | 1/1987 | (EP) . |
| 4142582 A1 | 6/1993 | (EP) . |
| 0 422 405 A1 | 4/1999 | (EP) . |
| 57-178947 | 11/1982 | (JP) . |
| 61-263846 | 11/1986 | (JP) . |
| 5-85287 | 6/1993 | (JP) . |
| 6-171445 | 6/1994 | (JP) . |

*Primary Examiner*—Sandra O'Shea
*Assistant Examiner*—Hargobind S. Sawhney
(74) *Attorney, Agent, or Firm*—Vanophem Meehan & Vanophem P.C.

(57) ABSTRACT

A headlamp and/or taillamp system having an impact-absorbing bumper that is designed to be mounted substantially flush with the surrounding vehicle body panels and bumper, while also being capable of deflecting with the stroke of the impact-absorbing bumper during impact to obviate the need for the headlamp and/or taillamp to pivot about an anchor point or to be mechanically displaceable with additional hardware. The headlamp and/or taillamp is preferably formed from resilient, impact resistant material, such as a high impact plastic, in combination with a deformable flexure member that is located selectively between the lens and the vehicle to resiliently respond to impact. The material for the flexure member must be selected to have a yield strength that is adequate to sustain a predetermined degree of deformation, corresponding to the amount of deflection required to deflect with the bumper stroke. The flexure member permits the lens or other components of the headlamp assembly to move rearward upon impact without damage to itself or any other surrounding assembly components, acts as a seal between the lens and the housing so that moisture, water, dust or other contaminants do not degrade the function of the lamp system, and may be used as a styling element to enhance the aesthetic effect of the vehicle. The lamp system achieves a more aerodynamic, contemporary look, and allows stylists complete freedom to create a flush, convex-shaped aerodynamic front end or rear end system with each vehicle design.

4 Claims, 8 Drawing Sheets

U.S. PATENT DOCUMENTS

| | | | |
|---|---|---|---|
| 4,602,319 | 7/1986 | Moriyama et al. | 362/527 |
| 4,644,447 | 2/1987 | Sturtz et al. | 362/549 |
| 4,658,335 | 4/1987 | Culler | 362/549 |
| 4,667,995 | 5/1987 | Wilkins | 362/505 |
| 4,758,034 | 7/1988 | Ghezzi et al. | 293/132 |
| 4,786,093 | 11/1988 | Nishii | 293/120 |
| 4,920,460 | 4/1990 | Mori | 362/496 |
| 4,974,125 | 11/1990 | McGehee | 362/505 |
| 5,010,456 * | 4/1991 | Reichman | 362/549 |
| 5,060,122 | 10/1991 | Miyoshi | 362/505 |
| 5,243,503 | 9/1993 | Hu | 362/505 |
| 5,267,128 | 11/1993 | Shamir et al. | 362/505 |
| 5,364,142 | 11/1994 | Coiner | 293/117 |
| 5,373,425 | 12/1994 | Shirai | 362/461 |
| 5,388,037 | 2/1995 | Umeda et al. | 362/520 |
| 5,390,087 | 2/1995 | Daumueller et al. | 362/462 |
| 5,398,172 | 3/1995 | Kojima et al. | 362/546 |
| 5,428,510 | 6/1995 | Shirai et al. | 362/462 |
| 5,448,454 | 9/1995 | Nonaka | 362/546 |
| 5,497,301 | 3/1996 | Mc Mahan et al. | 362/505 |
| 5,497,303 | 3/1996 | Decinti et al. | 362/524 |
| 5,519,588 | 5/1996 | Sobeck et al. | 362/518 |
| 5,556,190 | 9/1996 | Saijo | 362/519 |
| 5,582,475 | 12/1996 | Yagi | 362/549 |
| 5,607,218 | 3/1997 | Choji | 362/548 |
| 5,607,221 | 3/1997 | Justus | 362/485 |
| 5,651,604 * | 7/1997 | Dobler | 362/507 |

* cited by examiner

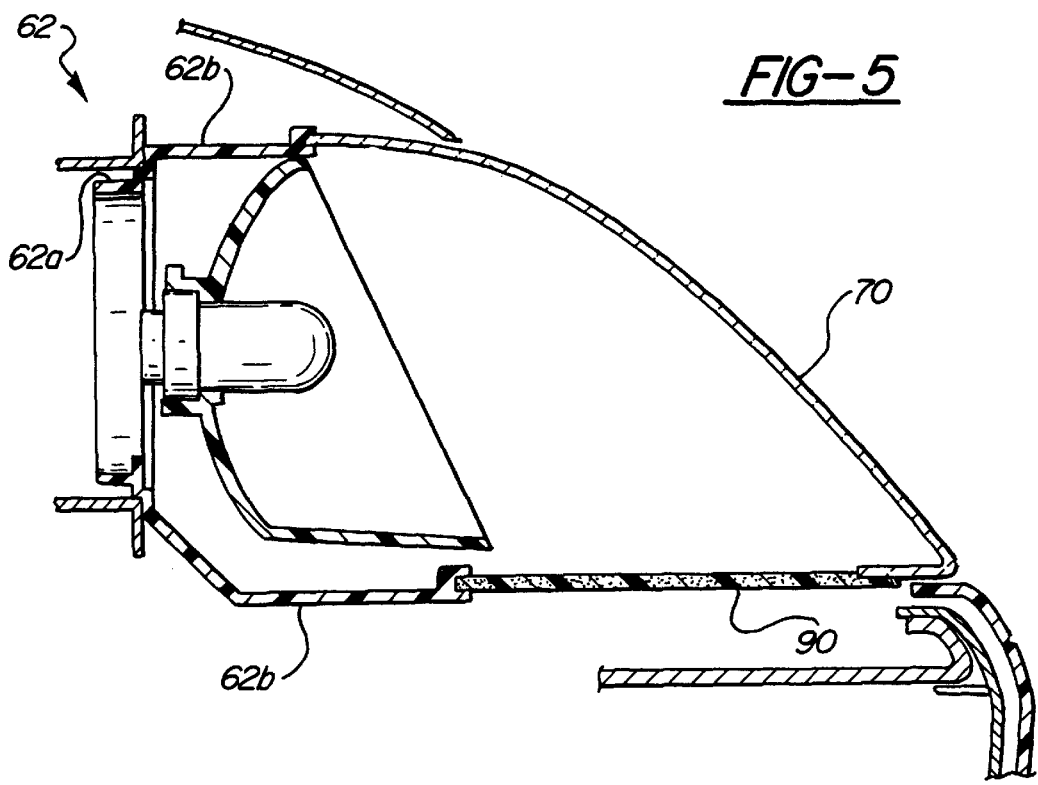
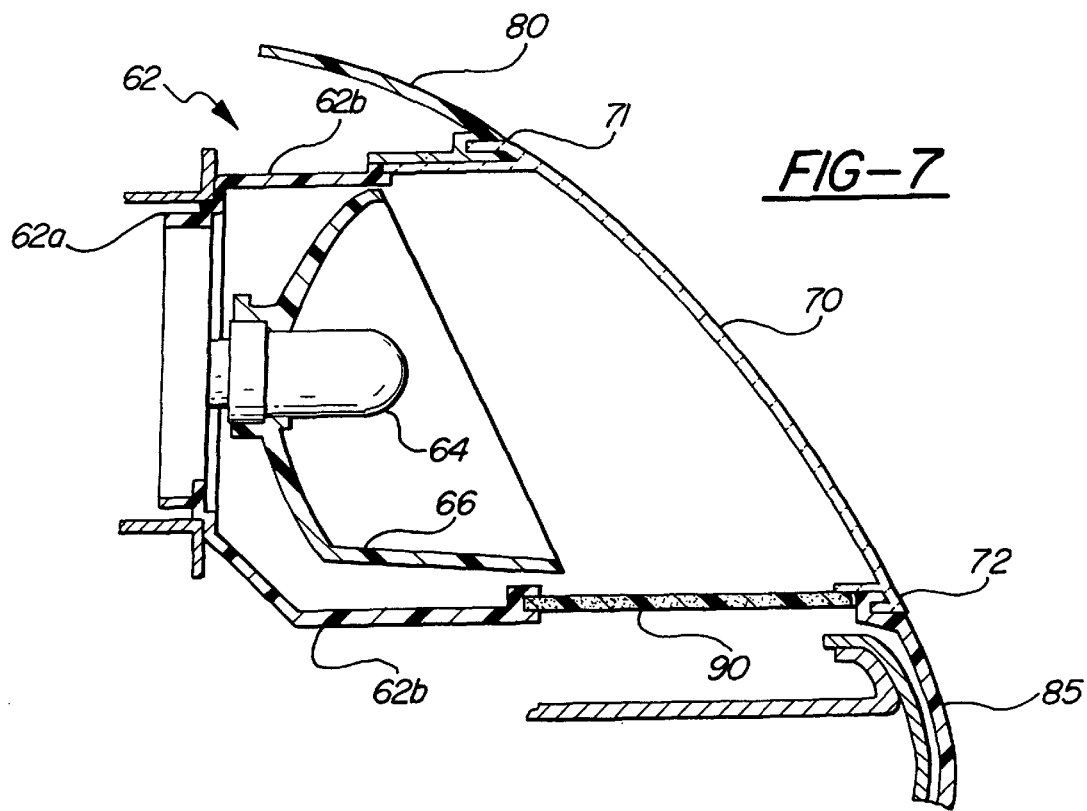

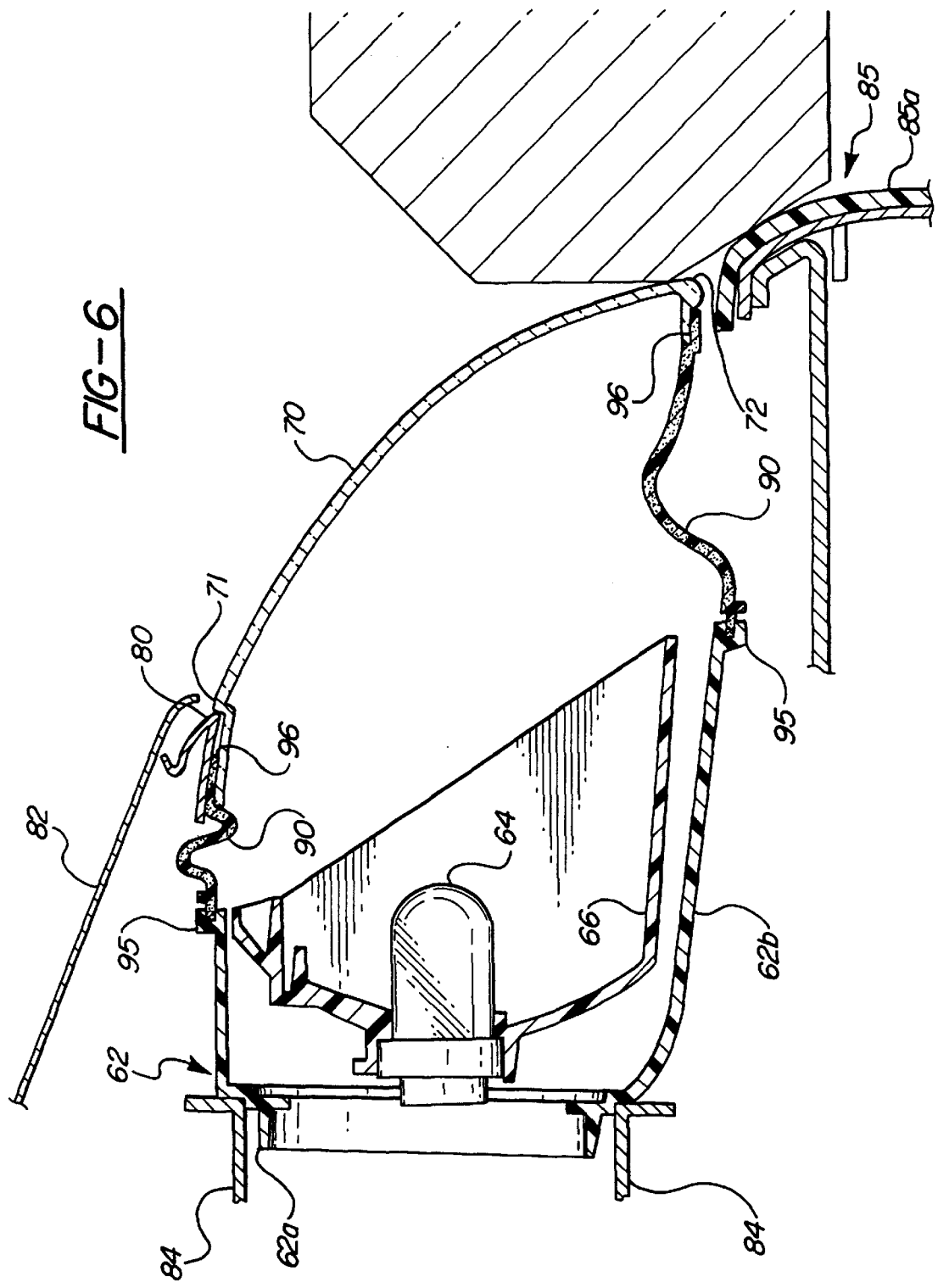

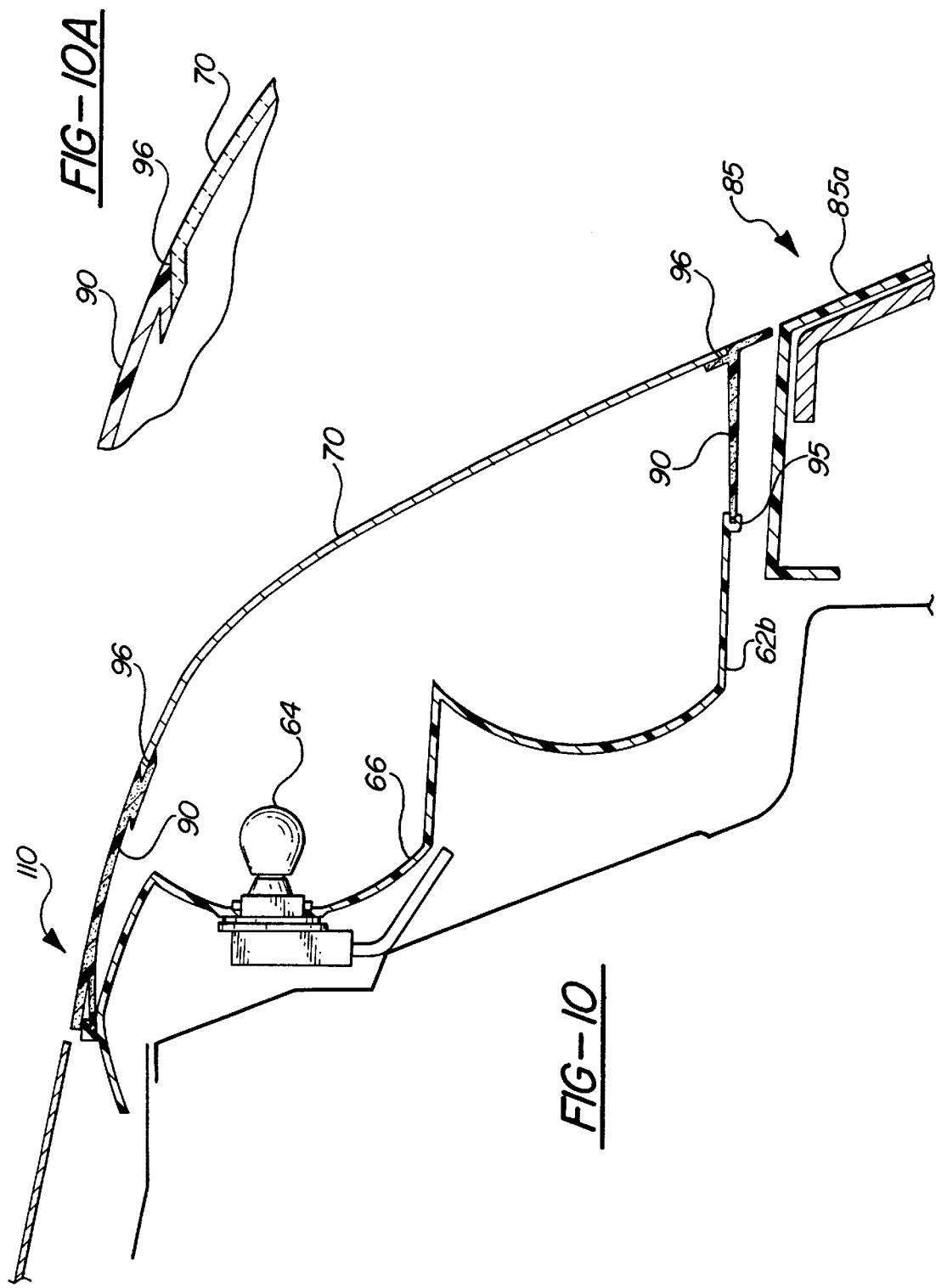

FLEXIBLE LAMP MOUNTING

BACKGROUND OF THE INVENTION

1. Field of the Invention

The present invention generally relates to automobile lamps positioned at the automobile's front end and/or rear end. More specifically, this invention relates to an automobile headlamp or taillamp housing that is capable of elastic deformation, yet is rigidly, directly or indirectly, attached to a fixed chassis component or body component (i.e. trunk, fenders, rear quarter, etc.) of the automobile. The flexible lamp mounting arrangement is able to withstand substantial flexure when the automobile bumper sustains an impact by an object and, therefore, the flexible lamp arrangement is particularly well suited for use with impact-absorbing bumpers that automatically rebound from a frontal impact.

2. Description of the Prior Art

Generally, automobile designers or stylists would like to create aerodynamic body shapes. Their motivation is not merely to reduce drag, but to create contemporary sculpted shapes that appeal to the marketplace. The automobile designers or stylists, however, are hampered by a variety of functional, economical, and other restraints.

With the advent of energy or impact-absorbing bumpers, front and rear ends of an automotive vehicle have been required to undergo significant design changes in order to accommodate the stroke of the bumper, that commonly can be as much as three to four inches. Generally, with respect to the front and rear end of a vehicle, designers would like a clean, convex transition from the front edge of the bumper rearward to the hood area and from the rear edge of the rear bumper forward to the sheet metal associated with the trunk area and rear deck lid. However, when viewing most vehicle designs currently available in the marketplace, this transition is normally an inward, concave box shape as shown in FIG. 1. The front bumper protrudes forward from the vehicle body, or the rear bumper protrudes rearward from the rear sheet metal in order to provide compliance with federal and automotive original equipment manufacturer's vehicle impact standards. These standards generally state that no damage can occur to non-bumper components or safety items, such as headlamps or taillamps, during 5 miles per hour barrier and front impacts, or 3 miles per hour pendulum impacts. Therefore, to achieve this objective, the original equipment manufacturing engineers have brought the bumper out away from the front and rear body panels, headlights, taillights, hood and grille, so that the bumper may stroke, thereby absorbing the impact energy without allowing intrusion into the components with subsequent damage. The clear result from such design is that the vehicle appears boxy, non-aerodynamic, and antiquated.

A closely related problem to the ability to absorb the impact energy of these federal and automotive vehicle impact standards concerns the location of the engine within the engine compartment. For example, in an attempt to obtain more passenger space within a vehicle, recent practice has been to push the mounts of the engine further and further towards the front of the vehicle. Accordingly, the ability to provide additional passenger compartment space is directly affected by the space available in front of the engine to enable moving the engine forward to obtain the maximum passenger compartment space. However, since the overall length of the vehicle is subject to limits dictated by the original equipment manufacturer, bringing the bumper forward away from the body, headlight, hood and grille intrudes into the maximum length, and the front end space of the vehicle becomes extremely valuable in that it directly affects the ability of automotive engineers to move the engine forward in an attempt to create additional passenger compartment space.

Similar problems existed with respect to automobile grilles, and such problems were solved by the use of a grille that is mounted substantially flush with the surrounding automobile body panels and bumpers, while also being capable of deflecting with the stroke of the impact-absorbing bumper during impact, thereby obviating the need for the grille to either pivot about an anchor point or to be mechanically displaceable with the additional hardware. Such a grille is disclosed in U.S. Pat. No. 5,205,597, owned by the common assignee hereof. The use of the teachings of this earlier invention, however, allowed the grille to be brought into the impact zone and absorb impact without damage. Unfortunately, while this helped to achieve a more aerodynamic and contemporary look in the grille area, the transformation is incomplete because along either side of the grille the fragile headlight system still requires protection, resulting in the boxy, non-aerodynamic situation as depicted in FIG. 1.

Several automotive equipment manufacturers have attempted specific solutions to this problem, but in doing so have failed to take into consideration the original equipment manufacturer's limitations set forth above, as well as the availability of space between the front bumper and the front of the engine in an engine compartment where the headlight system must be appropriately mounted. As set forth above, the traditional solution is to position the headlamps or taillamps entirely out of the path of the bumper during recoil after impact. This approach generally entails placing the automobile's headlamps rearward of the bumper or taillamps forward of the bumper, resulting in an extremely square looking profile that has little appeal according to modern design trends as depicted in FIG. 1. In addition, clearly such a design is not aerodynamic, but this approach has been generally followed for lack of a better solution. Another solution recently attempted by some of the original equipment manufacturers, is to require the headlamp and/or taillamp to be displaceable such that it can either pivot or otherwise move out of the path of the bumper during energy absorbing impact. Preferably, this approach allows the headlamp and/or taillamp to be mounted flush with the surrounding hood, front end, body panels and bumper, to enhance the styling and aerodynamics of the automobile by proving aesthetically pleasing, continuous smooth contour surfaces between the hood, bumper and headlamp lens surfaces. Such an approach is illustrated in Tomforde, U.S. Pat. No. 4,475,148, wherein the headlamp upper and lower housing compartments 3, 6, are pivotably mounted to a fixed component 4, at axis 5, to allow resilient cushioning of an impact in the longitudinal direction of the vehicle to minimize property damage and personal injury. This approach allows the top of the headlamp to pivot rearward when the headlamp is contacted at the bottom edge so as to reduce or prevent property damage in a collision with the vehicle and/or a stationary obstacle, as well as to avoid injury to a pedestrian by yielding in a longitudinal direction about pivot point 5. This approach appears extremely impractical as bumper heights are standardized on passenger vehicles, and an impact on the lower portion of the headlamp would not cause enough rotation to prevent the headlights from becoming severely damaged in case of an impact in a minor collision with another vehicle or a stationary obstacle.

Another example of an attempt to solve the above problems relating to the location of headlamps or taillamps in the impact zone is taught by Delmastro et al., U.S. Pat. No. 4,466,646. In this reference the lamp assemblies are mounted to an impact bar by the use of U-shaped springs to permit the lamp assembly to swing from its illustrated operating position to a protected position within the confines of the impact bar assembly in response to predetermined frontal impacts. The bumper fascia is mounted to an impact energy absorbing unit and its associated impact bar to absorb side or frontal impacts, store the energy in the impact bar and to avoid transmitting the energy into the vehicle frame, bodywork, or other vehicle components. Any frontal or side impact will permit the hinge assembly limited side and compound movement of the lamp assembly, so that it will not be damaged by any material of the energy absorbing unit crowding the headlamp assembly on corner impacts. After the impact load is removed, the impact bar and end section recover at predetermined rates to their original positions. The lamp assembly, of course, being connected to the U-shaped spring member, will likewise recover to its original position. Note that although this type of solution is proposed for fog lamps and signal lamps, the reference completely fails to set forth any solution, whatsoever, for avoiding damage to the headlamp in a frontal zone collision. Clearly, the design criteria to avoid damage to headlamps requires the headlamps to be set rearward a sufficient amount to allow the bumper to properly stroke during frontal impacts.

Another attempt to protect fog and taillamps mounted in the impact zone is shown in Vogelgesang, U.S. Pat. No. 5,288,177, wherein a fog lamp and turn signal lamp are mounted to the elastic bumper covering to allow the fog and turn signal lamp unit to move backwards in the case of a 30° pendulum impact after it has been acted upon by the impact and to return to its original position. The fog lamp and turn signal housing are attached to a bumper covering that, when impacted, moves towards the rear of the vehicle by pivoting about a fixed pivot mounted on the chassis that provides appropriate support for the fog lamp and turn signal housing, and allows the housing to pivot rearwards to absorb the impact and return to its original position thereafter. The supporting element is mounted at one end at a fixed member attached to the wheel housing and to the fog lamp and turn signal housing to allow the supporting element to pivot rearwards. After impact, the elastic bumper covering with the lamp units and the supporting element are returned to their original positions by the restoring force of the pneumatic impact absorbing devices.

In Roschinski et al., German patent publication DE 3802104 A1, the lighting unit is mounted in the area of the impact zone. Through the use of spherical balls mounted in a spherical socket the lighting unit is allowed to be removed from the socket upon impact in the longitudinal direction, and returned into the spherical socket by two compression coil springs located between the housing and the body of the vehicle. Because of the use of two spherical sockets that are mounted respectively in an upper and lower zone, the reference further teaches that a shock load acting obliquely from one side only will cause only one of the spherical balls to be displaced from the spherical socket and resume its original position through the use of one coil spring providing sufficient force to again engage the spherical ball with the spherical socket upon removal of the impact force. A similar arrangement is proposed for the fog and turn signal lamps, as well as for the rear lamps of the vehicle. As an alternative to the coil springs, a hydraulic, pneumatic or magnetic system that generates an appropriate force for restoring the position of the housing is also contemplated.

A further attempt to allow headlamps to be mounted forward, flush with the front fascia of the vehicle, is discussed in Kodama et al., Japanese Patent JP3-208738-A2, wherein the headlamp is mounted to a guide rail spaced a predetermined distance from side frame members, and interconnected with a connecting bar whose lower end is connected to the side member and upper end to the movable frame containing the headlamp, and adapted for sliding on the guide rail. The torsion bar system has a front part mounted in close proximity to the bumper fascia so that upon impact the bumper fascia collapses and retreats, activating the crank portion of the torsion bar system whereby the connecting bars are pivoted to slide the headlamp in a rearward direction away from the area of the impact zone to prevent damage thereto. After restoration of the bumper fascia to its original position, through the use of impact absorbing material such as foam, the torsion bar system utilizes its stored energy to return the headlamp along the guide rails to its original forward position. An alternate embodiment discloses the use of a scissor-like two bar mechanism that operates in combination with a torsion bar system to retract the headlamp in a rearward direction upon impact and through the stored torsional energy in the torsion bar system return the headlamp to the original position upon release of the impact with the bumper fascia.

As can clearly be observed from a review of the prior art, with the exception of German Patent DE 3802104-A1 and Japanese Patent 3-208738-A2, the prior art addressing of this problem only concerns fog lamps or turn signal lamps where damage criteria after impact, as established by government entities or original equipment manufacturers, is very low, or nonexistent. The proposal disclosed in the German reference relies mostly on a complex spring system to return the housing to its original position while the Japanese reference teaches that the bumper impact absorbing material will allow the pivoting mechanism cooperating therewith to return the lamp to its original position Since none of the bumper impact absorbing materials are required to return a headlamp to its original position by any automotive regulations, it is not possible to rely on such a system to permit controlling the headlamp to return to its original position after a bumper impact due to the strict regulations and tight tolerances on headlight aim patterns that would not allow any misalignment of aim pattern after impact outside of the tolerance limitations. Further, both the teachings of the German and Japanese patents have completely neglected the value of the space considerations surrounding the headlamp mounting area that directly reflects upon the forward placement of the engine and, in turn, the amount of space available in the passenger compartment of the vehicle. Accordingly, none of the systems provided in the prior art are adaptable to headlamps or taillamps that have strict regulations concerning damage after bumper impacts.

Therefore, what is needed is a simple, cost effective headlight and/or taillight system that can be brought into the impact zone to provide designers the freedom to create flush, convex-shaped, aerodynamic front end systems for vehicles that after impact return to their original positions without damage and continue to operate within the limits of the specifications set forth for headlamps and taillamps for automotive vehicles.

SUMMARY OF THE INVENTION

According to the present invention there is provided a headlamp and/or taillamp system for an automobile having an impact-absorbing bumper. The headlamp of the preferred embodiment is designed to be mounted substantially flush with the surrounding automobile body panels and bumper, while also being capable of deflecting with the stroke of the impact-absorbing bumper during impact, thereby obviating the need for the headlamp and/or taillamp to pivot about an anchor point or to be mechanically displaceable with additional hardware. Consequently, the headlamp and/or taillamp is preferably formed entirely from resilient, impact resistant material, such as a high impact plastic in combination with a deformable flexure member located selectively between the lens and the housing to resiliently respond to impact. Alternatively, the housing can be the resiliently deformable flexure member. The material for the flexure member must be selected to have a yield strength that is adequate to sustain a predetermined degree of deformation, corresponding to the amount of deflection required to deflect with the bumper stroke, as will be explained more fully below.

The invention contemplates placing the headlight lens forward into the impact zone and using a resiliently deformable flexure member placed selectively between the headlight lens and the vehicle to resiliently respond to impact. Since the headlight lens is a direct function of the application, that is, the type of vehicle the lens is used on, the placement of the resiliently deformable flexure member, in order to obtain the desired deflection, must be selective in order to adapt to each specific vehicle application. The resiliently deformable flexure member is made of a more flexible material such as TPU (urethane thermoplastic), TPO (rubber modified polypropylene), RIM (urethane), or TPE (thermoplastic elastomer) etc. The lens is generally a more rigid material, like polycarbonate and the housing is also relatively rigid, and can be made from either polypropylene, polycarbonate, or thermoset BMC polyvinylester, molded material. In the preferred embodiment disclosed, the lens has a body portion that has an upper edge that generally extends in a horizontal extent adjacent the engine hood of the automobile, and a lower edge that generally extends in a horizontal extent adjacent the bumper or bumper fascia. Accordingly, the headlight, taillight, fog light or turn signal light utilizing the invention as described herein achieves a more aerodynamic, contemporary look, and allows stylists the complete freedom to create a flush, convex-shaped aerodynamic front end or rear end system with each vehicle design.

Because the headlamp system is mounted further forward into the impact zone, car designers are given the freedom to utilize the additional space so as to provide the maximum amount of space in the engine compartment to be potentially used to allow engines to be mounted further forward and thereby increase the space available in the passenger compartment.

The flexure member serves multiple purposes. Its primary purpose is to allow the lens or other components of the headlamp assembly to move rearward upon impact without damage to itself or any other surrounding assembly components. A further obvious objective is to act as a seal between the lens and the housing so that moisture, water, dust or other contaminants do not degrade the function of the lamp system. Also, the use of a resiliently deformable flexure member may enhance the aesthetic effect of the vehicle by using the flexure member as a styling element of the lens or headlamp system, and through the use of differently colored materials, various finishes, and texture patterns the flexure member can be used as a decorative element.

The actual design of the flexure member is variable and highly dependent on the design of the lamp system and the headlight as a whole. In the preferred embodiment, the flexure member is placed selectively between the lens and the housing, or between the housing and its attachment point on the vehicle. The flexure member does not have to be a continuous ring about the periphery of the lens. What will define the location and use of the flexure member is how the lens is designed to deform during bumper impacts, where it is allowed to go without damaging itself, the physical location or structural interrelationship of the interior lamp components and surrounding components, as well as how the actual flexure member can best be manipulated. Optimizing a design is normally an iterative process. utilizing structural Finite Element Analysis (FEA), simulating the various impacts, and ultimately performing actual physical testing of prototypes.

The deflection characteristics of the flexure member material provides the basic deflection capability of the headlight system, or any one of its components, i.e. the lens or the housing. If desired, additional deflection can be provided by varying its section modulus along its length or width. Preferably, at least the lower area of the lens may be provided with a section modulus that is reduced in at least one predetermined area to provide a predetermined degree of elasticity without exceeding the predetermined yield strength of the material and without affecting the lighting characteristics of the lamp system. The section modulus may also vary such that there is a predetermined minimum section modulus at any of one or more points. As a result, the predetermined degree of elasticity provides a degree of resiliency to the entire headlamp system. With the above capability for flexing, the headlamp system can be fixed to the automotive vehicle at points along the upper edge and sides to firmly support the headlamp system, while still being able to elastically deform as a result of its deflection characteristics and variation in section modulus to be able to both sustain a predetermined impact or to stroke with the bumper during an impact without exceeding the predetermined yield strength of the flexure member. Due to the localization of the flexing in predetermined areas of the lens, the deflection in the remainder of the body portions away from the predetermined areas is significantly reduced. As a result, the likelihood of permanent yielding occurring in the lens is eliminated. Accordingly, reducing the section modulus in any one or more predetermined points of the headlamp lens or housing in conjunction with using a material having predetermined deflection characteristics allows the headlamp to be rigidly attached to the automobile yet provide deflection characteristics according to the invention. Consequently, there is no requirement for the headlamp to be pivotable about a mechanical pivot when the bumper sustains an impact. In addition, the need for additional hardware or special resilient fasteners is reduced or eliminated.

In addition, a significant advantage of the present invention is that the section modulus of any one of the components may be modified without affecting the exterior appearance of the headlamp system and/or lens associated therewith. As a result, the optimum section modulus for different applications can be experimentally ascertained by either modifying the mold that forms the member or by mechanical means to contour and remove material from any area of any one flexure member.

It is also contemplated that spring steel inserts can be molded into the flexure member to assist the lens in returning to its original position. This would assist in defining and controlling the location and shaping of the resiliently deformed flexure member while providing an appropriate assist force in returning it to its original pre-impact position. Also, such an arrangement could be used if there is a need to flex the flexure member beyond the flexure member's material yield point in specific applications, yet enable the flexure member to completely return to its pre-deformed position utilizing the spring inserts molded therein.

Accordingly, it is an object of the present invention to provide an automobile headlamp, taillamp, or auxiliary lamp system that is able to withstand a predetermined impact without fracturing any of the components thereof by the use of a flexure member as one of the components of such system.

It is a further object of this invention that such an automobile headlamp, taillamp, or auxiliary lamp system be suitable for use on an automobile having an impact-absorbing bumper such that the automobile headlamp, taillamp or auxiliary lamp system is mounted forward with the bumper or body panels surrounding it yet is capable of resiliently deflecting with the stroke of the bumper without sustaining structural damage thereto without significantly affecting its optical characteristics.

It is yet a further object of this invention that such an automobile headlamp, taillamp, or auxiliary lamp system be provided with a reduced section modulus in any one of the areas of the components of each of the systems for concentrating the deflection in that area of the specific component, while substantially reducing the flexure in the remainder of the headlamp, taillamp, or auxiliary lamp components.

It is yet still a further object of this invention that by concentrating the flexure of the headlamp, taillamp and auxiliary lamp components in predetermined areas, the headlamp, taillamp, or auxiliary lamp system can be rigidly attached to the automobile body panels or chassis components without the need for additional pivoting hardware or resilient brackets to support the headlamp, taillamp or auxiliary lamp system.

It is another object of this invention that such a headlamp, taillamp, or auxiliary lamp system be securable directly in a fixed location to the automotive body or chassis components so as to provide structural resistance to environmental effects such as wind and vibration.

It is still another object of this invention that such headlamp, taillamp or auxiliary lamp system have reduced cost, component weight and complexity, yet provide the ability for the headlamp, taillamp or auxiliary lamp system to provide all the functionality of current headlamp systems, while appropriately responding to bumper impacts without damage thereto.

Other objects and advantages of this invention will be more apparent after a reading of the following detailed description taken in conjunction with the drawings provided.

BRIEF DESCRIPTION OF THE DRAWINGS

FIG. 5 is a cross-sectional view of the headlamp assembly of the invention;

FIG. 6 is a cross-sectional view of the automobile front end of FIG. 2 illustrating a frontal impact with an obstacle in accordance with the preferred embodiment of this invention;

FIG. 7 is a cross-sectional view of a headlamp according to the invention where the headlamp is designed to register with surrounding front end fascia similar to FIG. 2;

FIG. 10 is a cross-sectional view of the automobile rear end of FIG. 9 illustrating the taillamp assembly of the invention;

FIG. 10A is a view of an alternate embodiment of the sealed joint depicted in FIG. 10.

DETAILED DESCRIPTION OF THE PREFERRED EMBODIMENT

Figure 1:
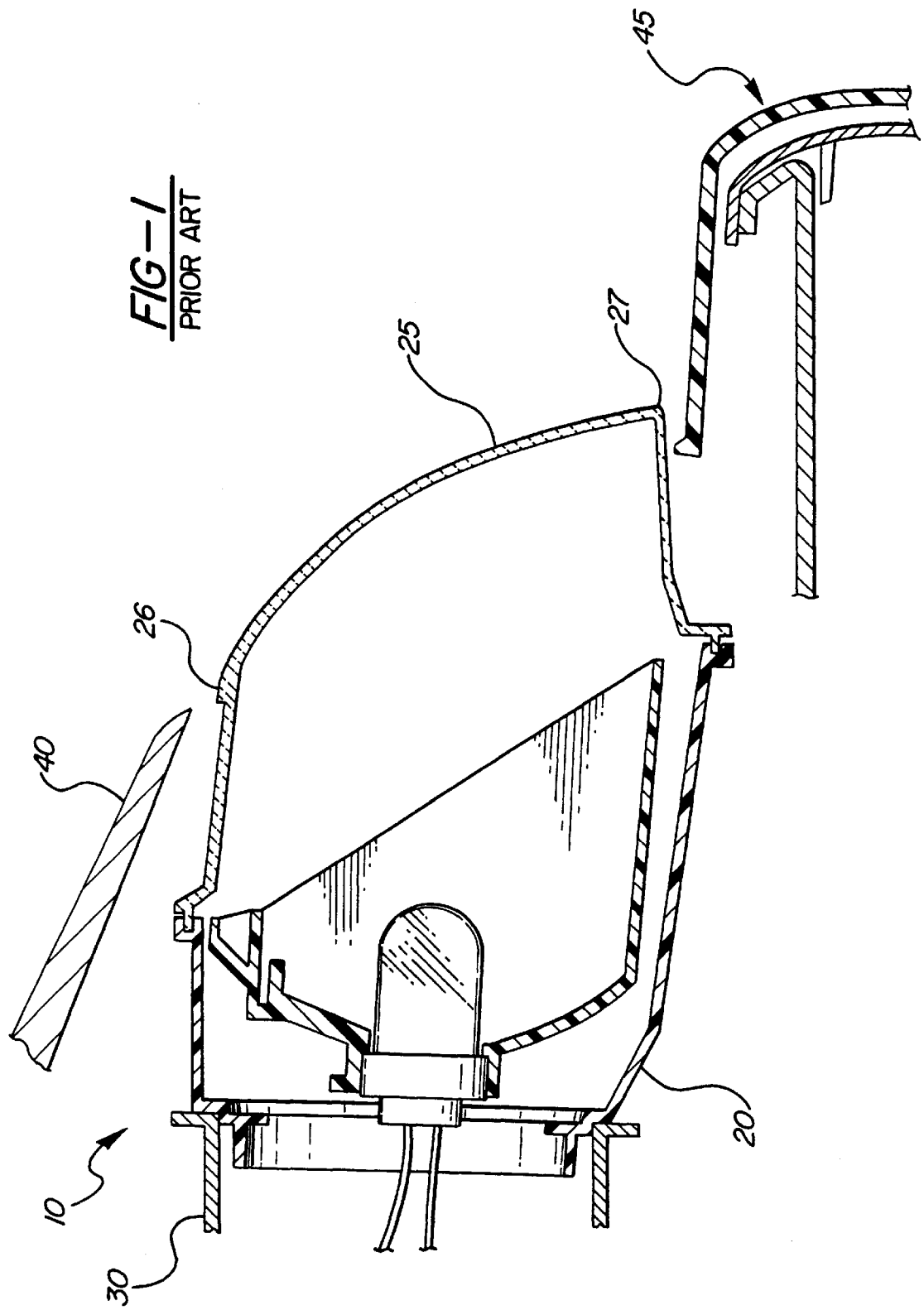
FIG. 1 is a cross-sectional view of a prior art headlight system wherein the bumper protrudes forward from the vehicle body resulting in a convex hood line that aerodynamically transitions into the upper edges of the headlamp but results in an inward box shape and concave transition from the lower edge of the headlamp to the front edge of the bumper fascia.
Figure 2:
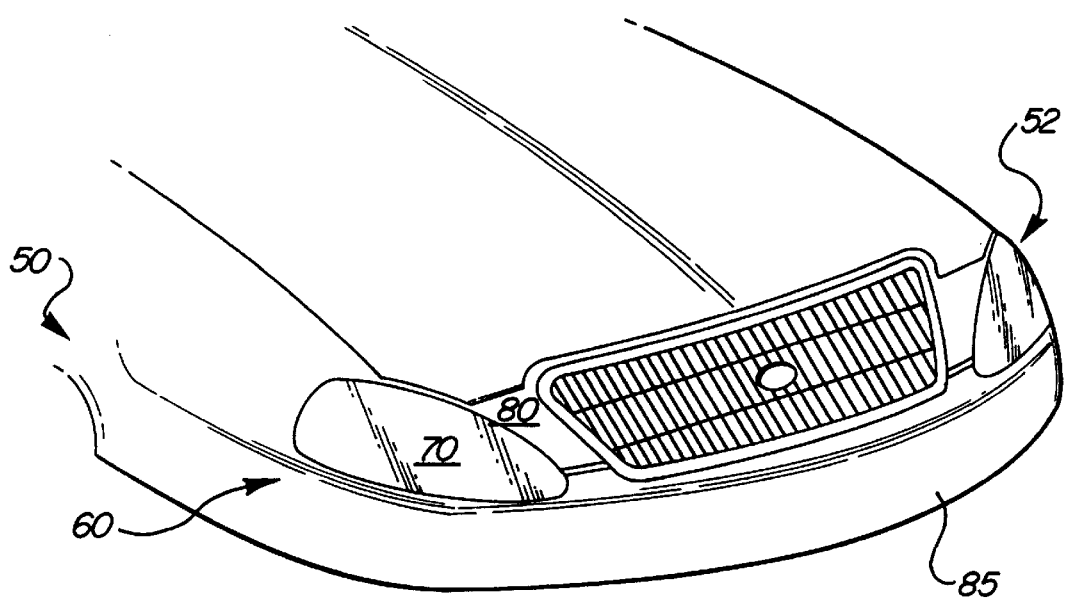
FIG. 2 is a partial perspective view of an automobile front end having an impact-absorbing bumper and a headlight system in accordance with the preferred embodiment of this invention.

As set forth above, FIG. 1 is an illustration of a prior art headlamp assembly having a lamp housing 20 mounted to the chassis 30 of the front end of an automotive vehicle 50 (shown in FIG. 2). The optical lens member 25 has a top portion 26 mounted substantially flush with the hood 40 of the vehicle 50 (shown in FIG. 2). The bottom portion 27 of the optical lens member 25 is located well rearward of the bumper assembly 45 and associated fascia so as to prevent the bumper assembly and associated fascia from damaging the optical lens member when the bumper assembly 45 is impacted.

In current automobiles, the bumper assembly 45 is an impact absorbing bumper assembly that is designed to withstand and absorb a predetermined impact without permanent deformation. At this time, such a bumper assembly 45 is required to absorb a 5 mile per hour impact, after which the bumper assembly 45 must return to its pre-impact position. During the course of an impact, the bumper assembly 45 will travel rearward of the automobile front end portion 52 (shown in FIG. 2) three inches or more. After impact, in which the energy of the impact has been dissipated through the resilient structure of the bumper assembly 45 and associated fascia, the bumper will return to its original pre-impact position.

Figure 3:
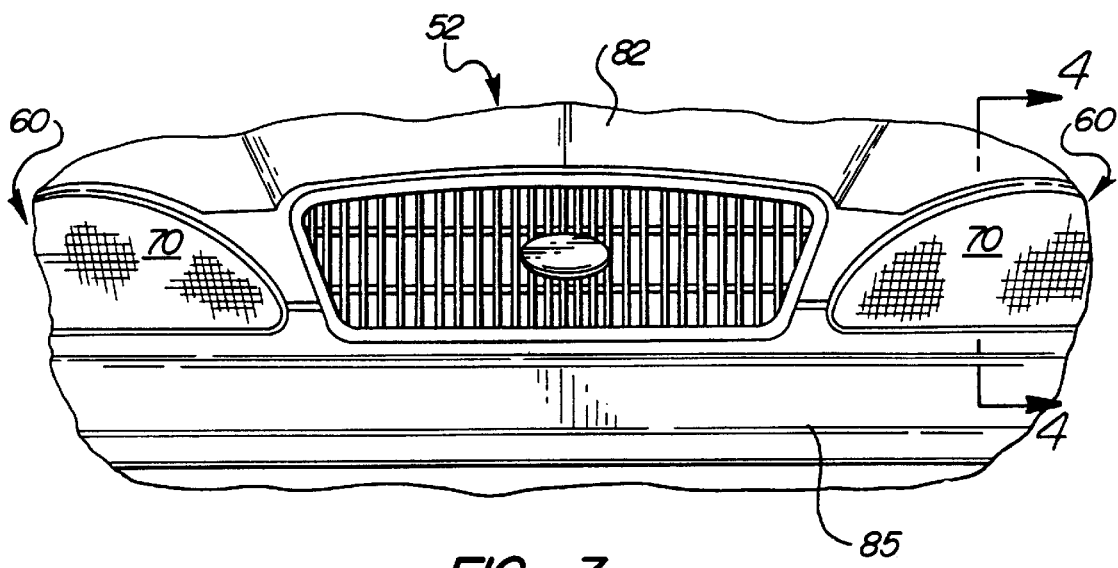
FIG. 3 is a frontal view of the automobile front end of FIG. 2.

With reference to FIGS. 2 and 3, there is shown an automobile vehicle 50 front end portion 52 having a headlamp or headlight system 60 with a headlamp lens 70 mounted forward into the impact zone and blending with the body panels and/or fascia surrounding the lens 70, according to the invention. As illustrated, the lens 70 is mounted to blend with the fascia 80 located forward of the engine hood 82. In this position, the headlamp system 60 is suspended above a front bumper assembly 85 of the automobile front end portion 52. According to the preferred embodiment, the headlamp system 60 can be mounted forward so as to have the lens 70 adjacent to its surrounding automobile body panel structure, such as the bumper assembly 85, front end fascia 80 and/or downwardly extending hood structure 40 as shown in FIG. 1.

Because of the resilient nature of the bumper assembly 85, the headlamp system 60 of the present invention is also required to resiliently respond to an impact to the bumper assembly 85, particularly when the headlamp lens 70 is mounted forward next to the bumper assembly 85. Accordingly, the material and structure of the headlamp system 60 must be such that the elasticity within the various components of the headlamp assembly acts to absorb the impact forces without any component of the headlamp system 60 fracturing or discontinuing to function as intended. As an initial matter, the material of the various components of the headlamp assembly must have sufficient impact resistance as well as provide a seal for the headlamp assembly so that moisture, water, dust or other environmental contaminants do not degrade the function of the lamp system.

The primary consideration for this capability is that the rigidity of a structural member is dependent upon the flex modulus of the material from which it is made. Flexure of any component can be further enhanced by changing the section modulus of the component. Briefly, the section modulus is the component's moment of inertia about its neutral bending axis divided by the distance between the neutral axis and the highest-stressed fiber of the member. The section modulus is entirely a property of the shape and size of the cross section of the member.

A primary consideration for evaluating the stress in a member is based upon its deflection characteristics. The formula for calculating the deflection in a beam is given by:

$$f = Pl^3 / mEI$$

where $f$ is the measurable deflection in the beam, P is the deflection load, l is the span of the beam, m is a coefficient determined by the manner in which the beam is supported, E is Young's modulus for the material, and I is the cross section's moment of inertia about the neutral bending axis. As will be more fully described below, a decrease in the section modulus I/c produces an increased deflection $f$ in the member under a constant load P. Accordingly, by varying the section modulus of a member and maintaining a constant deflection the stress can be substantially influenced. This relationship will be discussed more fully below in conjunction with a more detailed description of the construction of the headlamp system 60 of the present embodiment.

As a second consideration, flexure of a structural component may also be controlled by changing its section modulus. As stated above, the section modulus allows one to calculate the maximum stress in a member according to the equation:

$$S = M/(I/c)$$

where S is the maximum stress (at the highest-stressed fiber located a distance c from the neutral axis of the member—generally, the outermost fiber of the member), M is the bending moment on the member, and I/c is the section modulus. Accordingly, with a constant bending moment M, any increase in the section modulus I/c (roughly, any increase in the cross section of the member) will proportionally reduce the stress S in the outermost fiber of the member, thereby necessitating a higher load to produce a fracture in the member.

More importantly for the purposes of this invention, the flexibility of the headlamp assembly and particularly the lens 70 must be provided by its own structure or its adjoining structure such that the headlamp assembly components including the lens 70 will more readily deflect at predetermined locations. As a result, the stresses during impact will be concentrated in predetermined regions of selected components to be better able to absorb them without exceeding the yield point of the components while minimizing the effect of the impact upon the remainder of the components of the headlamp assembly without deteriorating the optical characteristics of the headlamp assembly.

Figure 4:
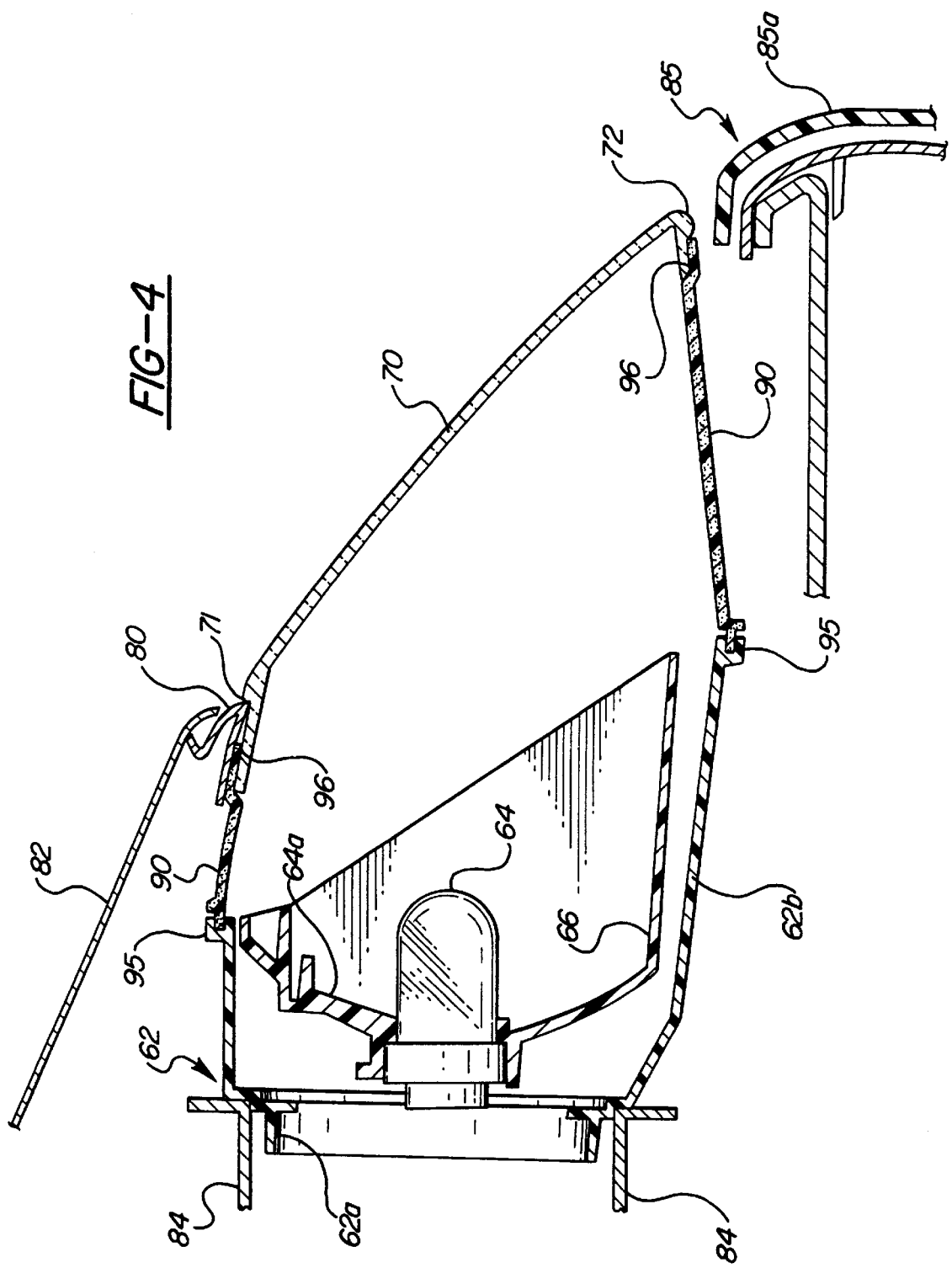
FIG. 4 is a cross-sectional view of the automobile front end taken along line 4—4 of FIG. 3.

With reference to FIG. 4, there is shown a typical reflector optic style headlamp system 60 including a headlight housing 62, having one end 62a, mounted to a part of a chassis 84 of an automotive vehicle. An electric light source 64 is mounted in a typical reflector member 66 whose parabolic inner surface 64a is silvered to reflect and direct light rays emanating from the electric light source 64, as is well known in the prior art. Alternatively, a suitable direct filament lamp design may be readily utilized instead of the lamp assembly shown. The headlight housing 62 has a rearwardly extending portion 62b for purposes to be described hereinafter.

With reference to FIGS. 4 through 6, there is illustrated a lens 70 that has been mounted forward into the impact zone. An upper portion 71 of the lens 70 is mounted adjacent the automobile hood 82 so as to aesthetically blend therewith while a lower portion 72 of the lens is directly located into the impact zone adjacent to the bumper fascia 85a to aesthetically blend therewith and thereby provide an aerodynamic body shape, preferable to car designers or stylists. This arrangement provides a clean, generally smooth transition from the front edge of the front bumper assembly 85 rearward to the hood 82 and significantly reduces drag from the prior art arrangement shown in FIG. 1. This contemporary sculpted shape also has significant appeal in the marketplace.

In order to permit the lens 70 to move rearward without damage to itself or any other component of the headlight assembly there is provided a resiliently deformable flexure member 90 between the lens 70 and the headlight housing 62. Although this is the flexure member's 90 primary purpose, the flexure member 90 also acts as a seal between the lens and the headlight housing so that moisture, water, dust or other contaminants do not degrade the function of the headlamp system over its intended life cycle. Further, the flexure member can be utilized to provide an aesthetic styling effect, through the use of different colored materials or different external finishes to decorate the flexure member if desired.

The design of the flexure member 90 is variable and highly dependent on the design of the headlamp system for a specific vehicle as a whole. In the preferred embodiment, the flexure member is placed selectively between the lens 70 and the headlight housing 62. Alternatively, the housing itself can be a resiliently deformable flexure member directly attached to the lens 70. As shown in FIG. 5, the flexure member does not have to be a continuous ring about the periphery of the lens 70. The peripheral location and use of the flexure member 90 is directly determined by how the lens 70 is designed to deform during bumper impact, the space availability within and surrounding the headlamp system, to allow the flexure member to resiliently deform without exceeding its yield strength or damaging itself, and how the flexure member is efficiently manipulated to achieve its several functions. Optimizing the flexure member's specific structure is normally an iterative process utilizing Finite Element Analysis (FEA), simulating various types of impacts and ultimately performing actual physical testing of prototypes.

In order to maintain the integrity of the headlight system 60, the flexure member 90 ultimately selected for a specific application must be attached to the housing 62 and lens 70 in a sealed relationship. Accordingly, in this preferred embodiment appropriate seals 95 and 96 with the housing 62 and with the lens 70 must be established to ensure the continued long term integrity of the headlamp and its optical characteristics over its life cycle. There are a variety of ways this can be accomplished. For example, the flexure member 90 can be two shot molded to the lens 70 or housing 62 whereby the housing 62 or lens 70 is molded first and the flexure member is molded second. Adhesion between the two is achieved by a continuous overlap or butt joint where the hot melt of the second shot bonds to the material of the first shot. Such a sealed joint is shown in FIGS. 4 and 6 at 96. Alternatively, the flexure member can be insert molded using a similar process to the above, but using separate injection molding machines. The flexure member 90, housing 62, and lens 70 can also be molded separately and thereafter bonded together, mechanically or adhesively. A person skilled in the art will know the many various ways the flexure member 90 can be sealingly attached to the lens 70 and headlight housing 62.

The impact requirements are strictly defined by various government agencies worldwide. The most common regulations concern low bumper speed impacts and lighting functionality. In general, the regulation's purpose is to assure no degradation in lighting functions or long term durability after low speed (5 miles per hour or less) impacts. The primary goal of the invention disclosed herein is to achieve the necessary deformation without exceeding the yield limit in any of the lighting components. Minor yielding in the flexure member is allowable as long as the lens 70 and housing 62 do not exceed their yield limit and return to their original positions after the impact force is removed. Some regulations allow mis-aiming to occur after such low bumper speed impacts as long as the deviation is within the specification limits of the aiming system. With reflector optic and projector optic style headlamps where the lens is clear with no optical characteristics designed in the lens 70, the need to return the lens 70 to its exact original position is less critical than in lens optic style headlights where the lens 70 has an optical function in directing the beam of light.

Additional criteria for optimizing the design of the headlamp system 60 and specifically the flexure member 90, is the effect of vibration and perceived quality of design. For example, if the flexure member and lens is too flexible it will feel flimsy to the consumer and lose credibility. More importantly, if the headlamp system or any component thereof is too flimsy it could vibrate and distort the light projected by it on a road and cause irritation to the driver, oncoming traffic, or traffic ahead of the vehicle. Further criteria includes heat sag and cold temperature impact. High temperatures are generated by light bulbs, the engine, ambient conditions and solar heat or a combination thereof. Resiliently deformable flexure member candidate materials cannot lose their functional characteristics so that they distort the lens 70 or significantly change its position. Also, the lamp system must still function properly after low speed impacts at low temperatures. Accordingly, the flexure member is made of a more flexible material such as urethane thermoplastic (TPU), rubber modified polypropylene (TPO), urethane (RIM), thermoplastic elastomer (TPE), and the like while the lens 70 is generally a more rigid material such as polycarbonate. The material of the housing 62 is also relatively rigid such as polypropylene, polycarbonate, or thermoset polyvinylester (BMC), molded material.

As shown in FIGS. 4 through 7, the headlamp system 60 can be rigidly attached to portions of the chassis or under-body components of the vehicle. Additional support can be obtained in those applications where the lens 70 is directly attached to the surrounding fascia or body panels surrounding the lens. Any suitable fastening device may be used, though consideration must be made for the requirement that the headlamp system must be resistant to wind and vibration forces generated when the automobile is in motion.

With respect to the headlight housing 62 and lens 70 it will be readily apparent to those skilled in the art that any one portion of the housing or lens could be formed to provide a plurality of reduced cross sections so as to provide a plurality of specifically located elastic regions between either of these components and their attaching points to the vehicle so as to allow resilient deformation of each selective structural component in place of a separate resiliently deformable flexure member. In the preferred embodiment, however, a resiliently deformable flexure member is used in combination with a housing 62 and lens 70 in order to accomplish the previously described objectives of this invention. This can be accomplished by selectively controlling the resilient deformation and geometry of the flexure member and the material flex modulus of any one of the components including the flexure member. Although the preferred embodiment does not contemplate the use of a reduced section modulus on any component, such alternative is clearly contemplated for specific vehicle applications.

For purposes of illustration, the section modulus I/c for the lens 70, flexure member 90 and headlight housing 62 if chosen to be a rectangular cross section is $$bh^2/6,$$

where $$I=bh^3/12,$$
$$c=h/2,$$

b is the vertical thickness of the member and h is the horizontal depth of the member in the plane of the impact force. By substituting this value within the previously described relationship for maximum stress noted above, it can be seen that a decrease in the depth h of any rectangular member produces an increase in the maximum stress in any such member according to the equation:

$$S=6M/bh^2$$

Now with reference to the deflection equation noted above, and noting again that $I=bh^3/12$, the relationship between the depth h and the deflection $f$ can be represented by the formula:

$$f=12Pl^3/mEbh^3$$

wherein a decrease in the depth h of any such member produces an increase in the measurable deflection $f$ in the member, given a constant deflection load P, beam span l, and thickness b. However, by combining the above equations, it can also be seen that:

$$f/S=2Pl^3/hMEm$$

wherein a decrease in the depth h of the member produces a proportional increase in the deflection to stress ratio $f/S$ given a constant bending moment M, deflection load P and beam span l. Thus, with a reduced section modulus there can be additional deflection within any such member while remaining within a predetermined stress limit, such as the maximum yield strength of the material of the headlight housing member 62.

Obviously, the bending characteristics predicted from the above calculation will be affected by any additional structural members of the headlight housing 62. Accordingly, the analytical discussion above is merely intended to illustrate the beneficial additional influence that a reduced section modulus has on the headlight system's bending characteristics according to the preferred embodiment of the present invention.

The influence on the headlamp system of the preferred embodiment of a low speed bumper impact is illustrated in FIG. 6. FIG. 6 shows a cross-sectional side view of the headlamp system in which the resilient deformation of the headlight system can be seen to be localized by the flexure member 90 with no effects on the headlight housing 62 and minimal effect on the lens 70. According to the teachings of the present invention it is contemplated that the deformation of the headlamp housing is controlled within the yield limit of the material itself by providing a material with a preselected flex modulus and, if necessary, enhancing the deflection by a reduced section modulus, so as to assist in absorbing the force of the impact, if desirable or practicable based on the space availability for accommodating the deflection of the flexure member within its yield limit. Such choice is completely dependent on the specific application on a vehicle considering the degree of elasticity provided by the deformation of the flexure member and the lens 70 so as to partially deform without exceeding its yield limit and follow the stroke of the bumper assembly 85, as shown, remaining flush with the bumper fascia 85a at both pre-impact (FIG. 4) and post impact positions. Accordingly, it may be desirable to provide the lens member 70 with structural modification, i.e. reduced section modulus over and above its deflection characteristics due to the flex modulus of the material so as to provide elastic deformation due to impact yet no visible structural effect upon post impact inspection.

A significant advantage of the headlight assembly of the present invention is that the ability to select a material with a predetermined flex modulus and to consider reducing the section modulus at one or more predetermined points on the headlamp housing 62, lens 70 or flexure member 90 eliminates the need for the headlamp system to pivot about some attachment point during the stroke of the bumper assembly 85 due to impact, as frequently taught by some of the prior art headlamp systems. Consequently, no additional hardware or special fasteners are required between the headlamp system and portions of the chassis and/or body of the vehicle.

As a result of the invention, the headlamp lens 70 can be mounted flush with its surrounding body panels; that is, the mounting arrangement provides aesthetically pleasing, continuous smooth contour surfaces between the hood bumper and headlamp lens surfaces. Accordingly, both the styling and aerodynamic characteristics of the vehicle front end are greatly improved.

Figure 8:
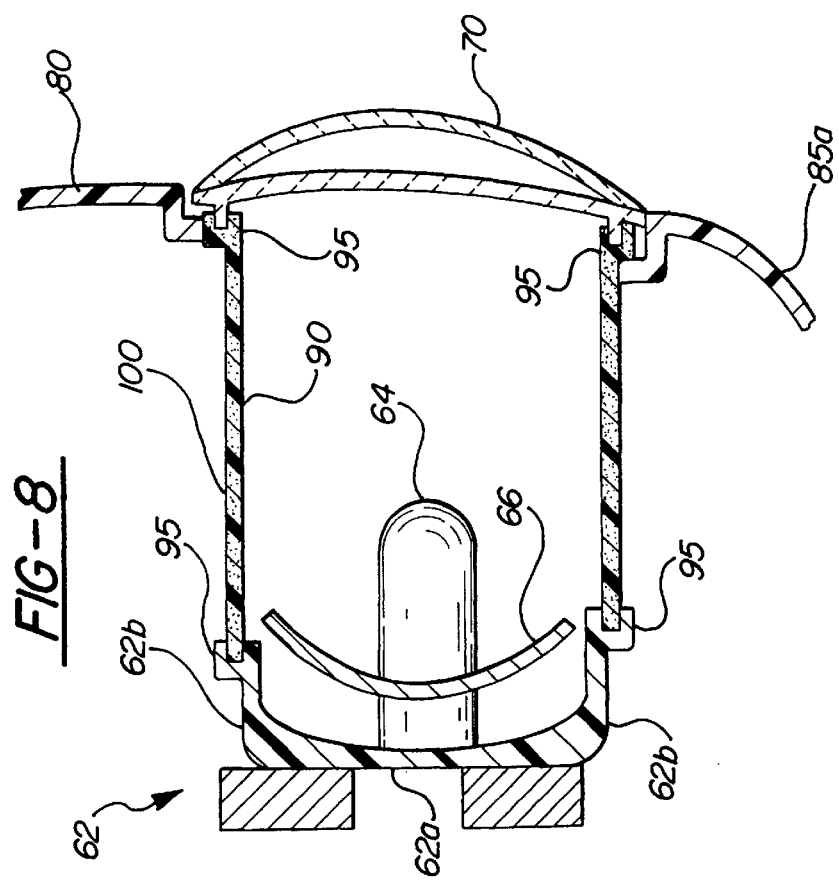
FIG. 8 is a cross-sectional view of a fog lamp assembly according to the invention.

FIG. 8 illustrates a fog lamp arrangement according to the present invention. The fog lamp lens 70 has been brought forward into the impact zone such that upon a frontal impact on the bumper system 85 and its associated fascia, the flexure member 90 will resiliently deform without exceeding its yield limit to absorb the impact force and return the lens of the fog lamp to its original pre-impact position. FIG. 8 also illustrates a further feature of the invention. Spring steel inserts 100 are molded into the flexure member 90 to assist the lens 70 in returning to its original position. Such arrangement is also contemplated with the headlamp embodiment of FIG. 6, as well as the taillamp shown in FIGS. 9 through 11.

Figure 9:
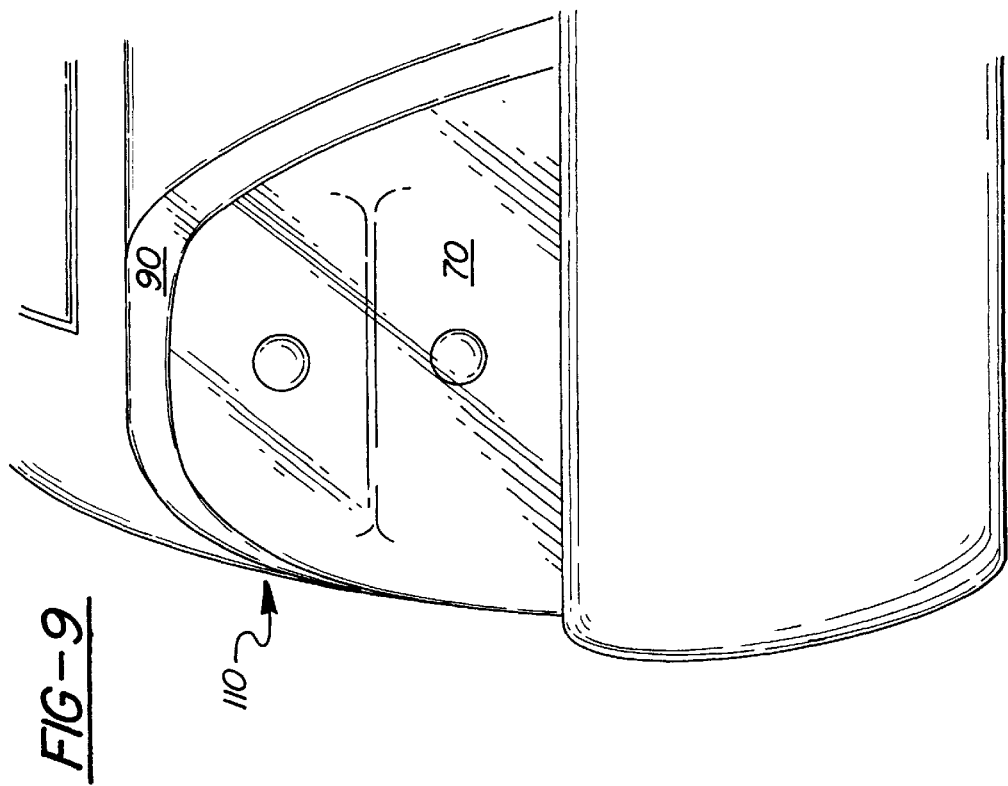
FIG. 9 is a partial perspective view of an automobile rear end having an impact-absorbing bumper and a taillamp system in accordance with a preferred embodiment of the invention.
Figure 11:
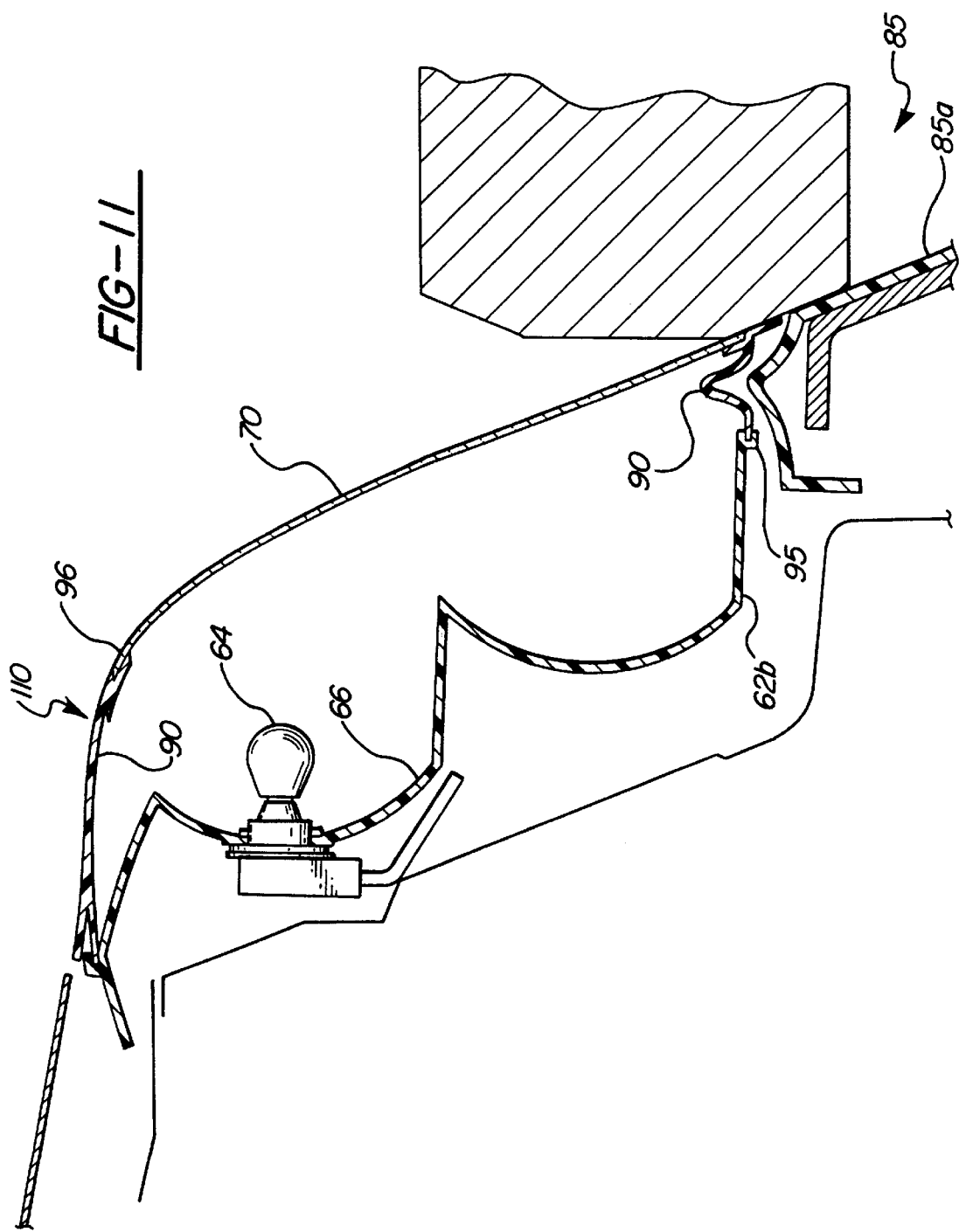
FIG. 11 is a cross-sectional view of the automobile rear end of FIG. 9 illustrating a rear end impact with an obstacle in accordance with the preferred embodiment of this invention.

FIGS. 9 through 11 illustrate the invention as applied to a rear taillamp assembly 110. Here, as previously described, the flexure member is directly molded to the lens 70 of the taillamp assembly 110. The taillamp assembly is attached directly to the vehicle (not shown) and arranged so that the lens 70 blends with the surrounding body panels or associated fascia. The taillamp assembly and its associated lens 70 has also been moved rearward into the impact zone of the rear bumper so that as the rear bumper is impacted the bumper and relevant components of the taillamp assembly move forward with the bumper as a result of the resilient deformation of the flexure member as shown in FIG. 11 to allow the taillamp assembly to return to its pre-impact position after the impact force has been removed without any structural damage thereto.

Another significant advantage of the present invention is that the section modulus of any of the structural members of the headlamp or taillamp assembly can be readily modified for experimental purposes. As a result, the optimum section modulus for different applications can easily be experimentally ascertained by either modifying the mold that forms a member, or by mechanical means to contour and remove material from a member's cross section.

In some applications, the impact may scuff or damage the lens. While the flexure member protects the body of the lamp from the shock impact, thus serving its intended purpose, it may require the replacement of a lens. Regulations of some countries permit replaceable lenses and although this is uncommon due to the additional assembly and design cost, this could be part of a practical solution in achieving an aggressive headlamp design that may sustain extreme impact conditions, i.e. impacts well in excess of 5 miles per hour.

Another advantageous feature of the present invention is that frequently portions of the headlamp housing or lens are required to be decoratively finished with paint or vacuum metalizing. Accordingly, depending on the desired aesthetic effect of the flexure member it could be attached to either the housing or lens component prior to decorating so that a separate operation for decorating the flexure member is avoided. Further, the flexure member can be decorated to provide a contrasting effect with surrounding components. Accordingly, the present invention provides an automotive headlamp, taillamp, fog lamp or signal lamp that is able to withstand a predetermined impact without fracturing any of the components, by elastically deforming predetermined components while also being suitable for moving the headlamp, taillamp, fog lamp, or turn signal lamp forward or rearward, as desired based on the type of lamp, into the impact zone of an impact-absorbing bumper such that the lamp system is capable of resiliently deforming with the stroke of the bumper and returning to is pre-impact position without any damage thereto.

The present invention provides further significant advantages of better economy due to the creation of a smooth aerodynamic design of the headlamp and bumper, eliminating the boxy-shaped offsets between the bumper and the headlights; allows additional packaging space for other vehicle components because with the lens of the headlamp system being mounted further forward, the housing can be placed further forward permitting added space in the engine compartment behind the housing; the aerodynamic design assists in creating an efficient low drag vehicle that results in less wind noise, improved handling and higher fuel efficiencies; use of the invention on taillights can result in increased trunk space. improved rear end aesthetics and improved aerodynamics; and the invention is an economically low cost approach to achieving relocation of the headlamps, taillamps, fog lamps and turn signal lamps into the impact zone.

While the invention has been described in terms of a preferred embodiment, it is readily apparent that the invention is readily applicable to taillamps, fog lamps, turn signal lamps or any other form of automotive exterior lamp that may be adapted by one skilled in the prior art. For example, the section modulus of the body panels surrounding the lens in the case where the lens is mounted to its surrounding fascia could be modified to provide the appropriate deflection of the lens member in combination with the resiliently deformable flexure member. Accordingly, the scope of the invention is to be limited only by the following claims.

What is claimed is:

1. An elastically deformable automobile lamp assembly for an automotive vehicle having at least one body panel, a chassis member supporting said at least one body panel, and a movable bumper member spaced a predetermined distance from said at least one body panel, said lamp assembly comprising:

a housing member having one end fixed to one of said chassis member and said at least one body panel and an other end extending in a direction away therefrom;

means for fastening said housing member to said one of said chassis member and said at least one body panel;

an optical lens member mounted adjacent another of said at least one body panel member and said movable bumper member; and at least one resiliently deformable flexure member secured to said optical lens member and said other end of said housing, said at least one resiliently deformable flexure member being formed from a material having a predetermined yield strength so as to provide a predetermined elastic deformation of said at least one resiliently deformable flexure member without exceeding said predetermined yield strength of said material, whereby said predetermined elastic deformation of said at least one resiliently deformable flexure member provides a degree of resiliency to said optical lens member secured thereto such that said lamp assembly may sustain a predetermined elastic deformation upon said movable bumper member being impacted without said at least one resiliently deformable flexure member exceeding said predetermined yield strength of said material and return said lamp assembly substantially to its pre-impact position without damage thereto upon removal of said impact force.

2. An elastically deformable automobile lamp assembly for an automotive vehicle having at least one body panel member, a chassis member supporting said at least one body panel member, and a movable bumper member spaced a predetermined distance from said at least one body panel member, said lamp assembly comprising:

a housing member having a closed end portion fixed to a portion of said automotive vehicle, and an open end portion extending away therefrom;

means for fastening said housing member to said automotive vehicle;

an optical lens member mounted adjacent said at least one body panel member and said movable bumper member; and at least one resiliently deformable flexure member secured to said optical lens member and said open end portion of said housing member, whereby as said movable bumper member is impacted and begins to move, said optical lens member moves along with said movable bumper member and said at least one resiliently deformable flexure member deforms without exceeding its elastic deformation yield limit so that said at least one resiliently deformable flexure member returns said optical lens member to its pre-impact position without damage to said lamp assembly upon removal of said impact force.

3. A lamp assembly comprising:

a housing member;

a lens member mounted in spaced relation to said housing member;

at least one resiliently deformable flexure member having one end attached to said housing member and another end attached to said lens member;

means for attaching said at least one resiliently deformable flexure member to said housing member and said lens member; and means for sealing said housing member, said sealing means being located between said at least one resiliently deformable flexure member and said housing and lens members, whereby said at least one resiliently deformable flexure member deforms upon impacting said lens member.

4. An elastically deformable automobile lamp assembly for an automotive vehicle having at least one body panel, a chassis member supporting said at least one body panel member, and a movable bumper member spaced a predetermined distance from said at least one body panel member, said lamp assembly comprising:

a housing member;

an optical lens member mounted adjacent said housing member in spaced relationship to said at least one body panel member and said movable bumper member;

at least one resiliently deformable flexure member interposed said optical lens member and said housing member;

means for attaching one end of said at least one resiliently deformable flexure member to said optical lens member, said means for attaching further comprising means for attaching an other end of said at least one resiliently deformable flexure member to said housing member; and means for sealing said one end of said at least one resiliently deformable flexure member to said optical lens member, whereby as said optical lens member is impacted by an external force, said resiliently deformable flexure member elastically deforms without exceeding a predetermined yield strength and returns said optical lens member substantially to its pre-impact position without damage thereto upon removal of said impact force.

* * * * *

UNITED STATES PATENT AND TRADEMARK OFFICE
CERTIFICATE OF CORRECTION

PATENT NO. : 6,190,030 B1
DATED : February 20, 2001
INVENTOR(S) : Lee A. Chase

It is certified that error appears in the above-identified patent and that said Letters Patent is hereby corrected as shown below:

Column 2,
Line 46, delete "proving" and insert -- providing --.

Column 4,
Line 13, after "bars" insert -- 20 --.
Line 37, after "position" insert a period --. --.

Column 8,
After "assembly" insert -- 10 --.

Column 9,
Line 30, delete "$f=Pl^3/mEl$" and insert -- $f=P^3l/m/EI$ --.
Line 34, delete "1" and insert -- $l$ --.

Column 10,
Line 59, after "and" insert -- by --.

Column 12,
Lines 55 and 63, delete "1" and insert -- $l$ --.

Signed and Sealed this

Twenty-sixth Day of February, 2002

*Attest:*

JAMES E. ROGAN
*Attesting Officer*   *Director of the United States Patent and Trademark Office*